June 30, 1959
A. R. KLEIN
2,892,234
WIRE RETAINER CLIP
Filed Oct. 15, 1953
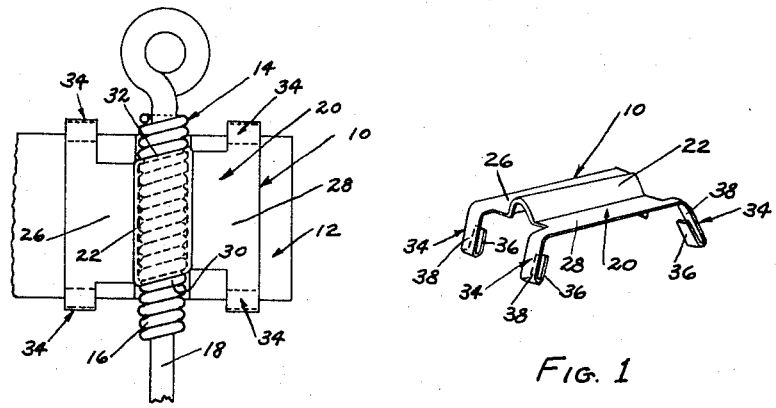
Fig. 4
Fig. 1
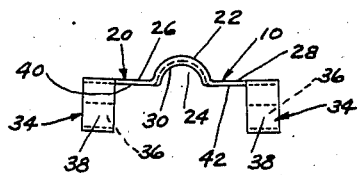
Fig. 2
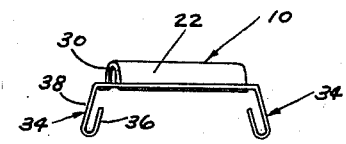
Fig. 3
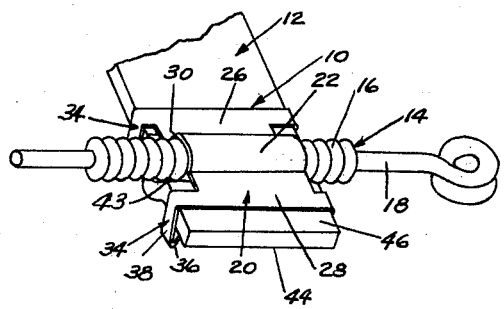
Fig. 5
INVENTOR.
ARTHUR R. KLEIN
BY
ATTORNEYS

United States Patent Office 2,892,234
Patented June 30, 1959

2,892,234
WIRE RETAINER CLIP

Arthur R. Klein, Willoughby, Ohio, assignor to Eaton Manufacturing Company, Cleveland, Ohio, a corporation of Ohio Application October 15, 1953, Serial No. 386,265

7 Claims. (Cl. 24—259)

This invention relates to clips and more particularly to wire retainer spring clips.

Broadly the invention comprehends the provision of a spring clip for use in securing the casing, sheath or armor of a wire in desired position and wherein the clip includes means for readily assembling it upon and disassembling it from a member to which the casing is to be secured.

Although clips of various forms have been devised and produced for securing the casing, sheath or armor of Bowden wire assemblies, none prior to the presently devised clip have permitted the free adjustment of said casing without necessity of releasing the clip from its assembled position and furthermore all prior to the presently devised clip have required screws or the like for securing same to a member upon which the casing is to be secured.

Among the principal objects of the invention is the provision of a clip for securing the casing or armor of a Bowden wire assembly upon a member in adjusted position, that:

(a) Is inexpensive to manufacture, and readily adapted to or removable from clamping assembly;

(b) Is of one-piece metal construction;

(c) Includes integral spring means for snapping the clip into secured engagement upon the member to which the wire casing is secured; and, (d) Includes flange means engageable with the convolutions of the Bowden wire armor permitting of the adjustable movement of the armor without disturbing the clamped arrangement of the clip to the member to which the armor is secured.

Other objects and advantages of the invention will appear from the following description taken in connection with the drawings forming a part of the specification, and in which:

Fig. 1 is a perspective view of a clip, constituting the invention;

Fig. 2 is an end view of the clip of Fig. 1;

Fig. 3 is a side view of the clip of Fig. 1;

Fig. 4 is a top elevation view of the clip of Fig. 1 as arranged in assembly with a Bowden wire assembly and a member to which the Bowden wire assembly is secured; and, Fig. 5 is a perspective view of the assembly of Fig. 4.

Similar reference characters indicate corresponding parts throughout the several views of the drawings.

The presently devised wire retainer clip provides a simple and cheap structure for readily and easily securing a Bowden wire assembly to a third member for affixing the position of the wire assembly. By so providing spring arms integral therewith, the clip can be quickly snapped upon a suitable member with the wire armor clamped between the clip and member. Provision is made in the construction of the clip permitting of the adjustable threading of the wire armor in either direction, said provision being in the form of angularly directed flanges formed integral with the clip which engage the convolutions of the armor. A portion of the clip directly engages the wire armor whereby with the wire armor clamped between the clip and member to which it is assembled the armor cannot shift longitudinally other than through a threading movement thereof as guided by the clip.

Referring to the drawings for more specific details of the invention 10 refers generally to a spring clip adapted for attachment to a member or plate 12 and between which a Bowden wire assembly 14 or the like is to be clamped, said wire assembly comprising a spirally wound armor 16 and a wire 18 longitudinally relatively movable in the armor.

Clip 10 is preferably made of spring steel sheet stock and comprises a main body 20, a portion of which is formed to channel section 22 providing a groove 24 of substantially semi-circular cross-sectional shape, with said channel section disposed to one side of planar portions 26 and 28 of body 20. The axial extremities of the channel section are provided with parallel flanges 30 and 32 angularly disposed to a plane perpendicular to the axis of the channel groove, with the flanges directed inwardly from the bottom of the groove 24 toward the planar portions 26 and 28 of the body.

The planar portions and channel section of the clip body provide a structure generally rectangular in plan with spring arms 34 extending from the extremities of the planar portions 26 and 28 of the body at a slight angle to a plane perpendicular to the plane of portions 26 and 28 and in a direction oppositely disposed to channel section 22.

Arms 34 so as to be effective to spring attach the clip 10 to a member such as a plate 12, include fastening hook portions 36 bent in an opposite direction to the main portions 38 of the arms and terminating a predetermined distance from surfaces 40 and 42 of the respective planar portions 26 and 28, said spacing of the ends of portions 36 of arms 34 being substantially equal to the thickness of the member to which it is to be attached.

Plate 12, as disclosed by Figs. 4 and 5, in assembly with Bowden wire assembly 14 and clip 10 has a longitudinal offset portion 43 providing a substantially semi-circular cross-sectional shaped groove which together with clip groove 24 provides a substantially circular groove in which the armor 16 of the Bowden wire assembly 14 is nestled.

In applying the clip 10 to the plate 12 effective to secure the Bowden wire assembly 14 therebetween, the wire assembly is first placed in the groove of the plate and then the clip is attached to the plate with the groove 24 in the clip receiving the exposed portion of armor 16 and with the arm 34 snapped into attaching engagement with the plate with the ends of portions 36 of the arms engaging the underside surfaces 44 of the plate with spring tension holding effect whereas the surfaces 40 and 42 of the clip engage the upperside surface 46 of the plate. As such a very rigid assembly is had of the clip, plate and Bowden wire assembly.

It will be noted from Figs. 4 and 5 that with the clip, wire assembly and plate so assembled that the flanges 30 and 32 of equal pitch or angularity with the spiral form of the armor are received between convolutions of the armor effective to resist direct longitudinal movement of the armor while permitting threading adjustment thereof relative to the clip 10 and wire 18.

It necessity arises to disassemble the clip and wire assembly from the plate the arms 34 can be readily and easily sprung from attached position on the plate and the repeated assembly and disassembly thereof can be effected without damage to the clip.

While this invention has been described in connection

What I claim is:

1. A wire retainer clip comprising planar surfaced portions, a portion connecting the planar surfaced portions having semi-circular cross-sectionally shaped channel disposed wholly to one side of and being substantially coextensive with said planar surfaces of first mentioned planar surfaced portions, and a flange at each end extremity of the second mentioned portion extending radially into the channel, said flanges being semi-annular in form, parallel to one another and disposed in an acute angle to a plane arranged perpendicular to the axis of the channel, said planar surfaced portions being provided with securing means for attaching said clip to a base member.

2. A wire retainer clip comprising a body of sheet stock material having a pair of substantially planar surfaces integral with and separated by a semi-circular cross-sectionally shaped portion providing a longitudinal groove, and a semi-annular flange at each end of the grooved portion the body, between the planar surfaces and extending radially inwardly a short distance into the groove, said flanges being parallel to each other and disposed in an acute angle to a plane parallel to a plane perpendicular to the axis of the longitudinal groove and said planar surfaced portions being provided with securing means for attaching said clip to a base member.

3. A wire retainer clip comprising a one-piece spring steel sheet stock construction including a pair of portions lying substantially in the same plane, a channel portion intermediate the pair of portions and integrally connected thereto, said channel portion providing a semi-circular cross-sectional shaped groove extending longitudinally coextensive with said pair of portions, and a flange at each end of the channel extending a short distance radially inwardly of the groove, said flanges being parallel to each other and disposed in an acute angle to a plane perpendicular to the axis of the groove, and said planar surfaced portions being provided with securing means for attaching said clip to a base member.

4. A clip according to claim 3 wherein the flanges are semi-annular in shape.

5. A clip according to claim 3 wherein the pair of portions each have a substantially flat surface disposed on the same side of the clip as the groove.

6. A clip according to claim 4 wherein legs are formed on the sheet body of the clip to extend perpendicularly to the plane surface of the pair of portions and are arranged at the ends of the pair of portions adjacent the ends of the clip near the groove ends, and including a portion near the extremity of each leg bent in an opposite direction to the main portion of the leg.

7. A clip according to claim 6 adaptable to be received by a body portion wherein the legs are formed to extend perpendicularly away from the plane surface of the pair of portions and the top of the groove and wherein the ends of each leg are spaced from the plane surface of the pair of portions an amount less than the thickness of the body to which the clip is to be secured.

References Cited in the file of this patent

UNITED STATES PATENTS

| | | |
|---|---|---|
| 733,945 | Connolly | July 21, 1903 |
| 852,431 | Greenfield | May 7, 1907 |
| 996,039 | Keuffel | June 20, 1911 |
| 1,704,472 | Grandjean | Mar. 5, 1929 |
| 1,725,883 | Recker | Aug. 27, 1929 |
| 2,002,103 | Wheeler | May 21, 1935 |
| 2,064,290 | Campbell | Dec. 15, 1936 |
| 2,303,108 | Blackburn | Nov. 24, 1942 |
| 2,353,795 | Tinnerman | July 18, 1944 |
| 2,469,938 | Tarnow | May 10, 1949 |
| 2,712,917 | Flora | July 12, 1955 |